Patented Aug. 11, 1931

1,818,037

UNITED STATES PATENT OFFICE

WALTER BRUCK AND FRITZ HELWERT, OF MANNHEIM, GERMANY, ASSIGNORS TO GENERAL ANILINE WORKS, INC., OF NEW YORK, N. Y., A CORPORATION OF DELAWARE

VAT DYESTUFFS

No Drawing. Application filed December 5, 1927, Serial No. 237,981, and in Germany December 6, 1926.

If 1.2.1'.2'- dinaphthazine-8.8'- disulfonic acid is fused with caustic potash a substance is obtained, which is insoluble in dilute alkalies and which therefore was hitherto not considered to be a dihydroxydinaphthazine, but was believed to be a condensation product thereof. We have now discovered that the above mentioned substance is converted by treatment with alkylating agents into new compounds which are, according to the results obtained by analysis and the determination of the molecular weight, dialkoxydinaphthazines. It is therefore believed that the product obtainable by treating 1.2.1'.2'- dinaphthazine-8.8'- disulfonic acid in the alkaline melt has the Formula I corresponding to 8.8'-dihydroxy-1.2.1'.2'-dinaphthazine or that of an insomer thereof which may be considered to differ from the aforesaid dihydroxy compound by the displacement of hydrogen atoms for example as in Formula II.

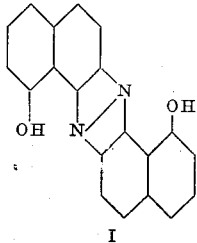
I

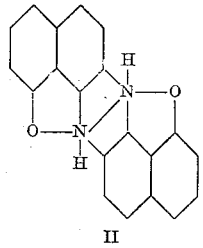
II

The compound in question is hereinafter referred to as 8.8'-dihydroxy-1.2.1'.2-dinaphthazine.

It is already known that the said product on slight halogenation according to the process of the U. S. Patent No. 1,538,400 furnishes substitution products which practically lack the character of vat dyestuffs. They contain from 3 to 4 atoms of halogen in the molecule.

We have now found that the halogenation of 8.8'-dihydroxy-1.2.1'.2'-dinaphthazines may be carried further and that, by this means, more highly halogenated products, which may contain at least six, and usually eight, ten or even more atoms of halogen, are formed which differ very decidedly from the aforesaid substitution products.

It is advantageous to carry out the said halogenation in a suitable dilution medium for example in acetic anhydride, a halogenated fatty acid, nitrobenzene, halogenated hydrocarbons or mixtures of the said dilution media. The halogenation may also be carried out in the halogenizing agent alone, for example in sulphuryl chlorid.

If desired, a halogenation catalyst, for example iodine may also be added.

The aforesaid products obtainable by the slight halogenation of 8.8'-dihydroxy-1.2.1'.2'-dinaphthazines, containing from 3 to 4 atoms of halogen in the molecule may also be employed as initial products, as well as the acyl compounds of 8.8'-dihydroxy-1.2.1'.2'-dinaphthazines.

The products obtained by the vigorous halogenation are to a large extent brown or pale yellow to orange in color and differ from the aforementioned slightly halogenated products by being readily soluble in organic solvents such as glacial acetic acid, benzene, pyridine or nitrobenzene. The properties of these new halogen products make it probable that they are not halogen substitution products, but products obtained by adding halogen on to 8.8'-dihydroxy-1.2.1'.2'-dinaphthazine or the above-mentioned tri- or tetra halogen derivatives thereof. They dissolve in concentrated sulfuric acid giving brown to blue solutions.

We have further found that the halogen may be removed from the aforesaid halogen addition products partly as such and partly in the form of halogen hydride. Under certain circumstances this can already be brought about either by simply heating the said compound as such or in a suitable dilution agent and the removal of halogen therefore sometimes already takes place during the production of the aforesaid halogen addition products, when the same is carried out at higher temperatures. As a rule it is however advantageous to employ agents capable of splitting off halogen either in the form of halogen hydride or as such or in both forms. Reducing agents serve for splitting off the halogen as such. As agents capable of splitting off halogen hydrides may be mentioned, for example concentrated sulfuric acid, inorganic or organic bases, sodium acetate and the like. Examples of reducing agents are for instance metals, sulfurous acid and its salts, hydrosulphite, alcohols, phenols, hydrazine and hydroxylamine and the derivatives thereof and the like. Under certain cimcumstances the operation may be carried out in two steps by first removing part of the halogen from one of the aforesaid highly halogenated products which give brown solutions in concentrated sulfuric acid by treating with a mild reducing agent such as aqueous sulfurous acid solution and then treating the intermediate product thus obtained in order to split off halogen hydride, for example with boiling aniline.

In all cases substances are obtained as final products which differ from the above-mentioned tri- or tetra-halogen-8.8'-dihydroxy-1.2.1'.2'-dinaphthazines by having a higher content of halogen, but above all in their valuable property that they can easily be vatted with alkaline hydrosulphite solutions and that their yellow vats dye vegetable and animal fibres strong red shades of, as a rule, remarkable fastness. In order to facilitate the vatting it is in some cases advisable to add dispersion agents, for example Turkey red oil. In many cases particularly bluish and strong dyeings are obtained by vatting the dyestuffs at 40° to 45° C. and dyeing at lower temperatures. Herein it is preferable to use greater quantities of alkali than is usual in the case of vat dyestuffs dyeing in the cold. The shades obtainable from the said vat have either a more bluish tinge or a more yellowish tinge depending on the temperature of the said vat. As a rule, the dyeings obtained at higher temperatures are of a more yellowish tinge.

If according to the method of working above described mixtures of dyestuffs are obtained, the products may be separated, if desired, for example by treatment with cold concentrated or moderately dilute sulfuric acid. That portion which is more difficultly soluble in sulfuric acid, as a rule, dyes with a more bluish tinge than the more easily soluble product. The purification may also be effected by treatment with organic solvents. By treatment with halogenizing agents the said dyestuffs are again converted into halogen addition products which in turn may be converted back into the aforesaid red vat deystuffs, when subjected to the treatment above described.

Both the red dyestuffs with a bluish and those with a yellowish tinge contain more than 4 atoms of halogen in their molecule, in particular those with a bluish tinge containing more than six atoms of halogen, and they give blue solutions in concentrated sulfuric acid, which on cautious oxidation with bichromate turn brown, which latter coloration is converted to blue on treatment with copper powder.

The following examples will further illustrate the nature of the said invention, but the invention is not limited thereto. The parts are by weight.

*Example 1*

31 parts of 8.8'-dihydroxy-1.2.1'.2'-dinaphthazine are heated to boiling with 900 parts of acetic anhydride, chlorine being then admitted, while stirring, until further absorption ceases. The reaction product is almost completely in solution, and separates out, on addition of about 250 parts of water, in the form of orange to brown crystals. The analysis of the crude reaction product discloses a chlorine content of 50 per cent corresponding to the presence of between 8 and 10 atoms of chlorine in the molecule. The substance dissolves readily in nitrobenzene, the solution being reddish yellow in color. When left in contact with alkaline hydrosulphite solution, the substance gradually passes into solution with the formation of a leuco derivative of a red vat dyestuff. The solution of the aforesaid brown substance in sulfuric acid gives off hydrochloric acid gas even in the cold, but more rapidly on warming. Treatment with water, after the evolution of gas has ceased, furnishes a red product which is very easily vatted with caustic soda solution and hydrosulphite and dyes cotton a bright red, with excellent properties as regards fastness.

*Example 2*

Chlorine is introduced at 130° C., while stirring into a suspension of 31 parts of 8.8'-dihydroxy-1.2.1'.2'-dinaphthazines in 900 parts of nitrobenzene, until a yellow solution is produced. A sample of the reaction mass gives, with concentrated sulfuric acid, a brown solution, from which a pale yellow precipitate is obtained on dilution with water. If the solution in concentrated sulfuric acid be warmed, preferably with an addition of copper powder, stannous chloride or the like, the color changes to blue, and on dilution with water a red precipitate is formed. To prepare the vat dyestuff, for example the yellow solution of the chlorination product in nitrobenzene is stirred with 80 parts of potassium acetate for several hours, at water bath temperature. The reaction mass deposits a red substance with properties similar to those of the product of Example 1.

*Example 3*

45 parts of the chlorinated products prepared in accordance with Example 3 of the U. S. Patent No. 1,538,400 are heated to boiling with 900 parts of acetic anhydride, and chlorine is passed into the solution at 130° C., until a sample of the reaction mass, dissolved in concentrated sulfuric acid, furnishes an orange yellow precipitate on dilution with water. The reaction mixture is diluted with 250 parts of glacial acetic acid, and boiled until the evolution of hydrochloric acid ceases. On filtration by suction, a red product is obtained which differs from the original material in being easily vatted, and giving intense red dyeings on cotton.

*Example 4*

31 parts of dihydroxydinaphthazine are dissolved in 600 parts of boiling nitrobenzene. After being cooled down to 80° C., 1 part of iodine is added, and 150 parts of sulfuryl chloride are gradually stirred in, the temperature being maintained at between 80° and 90° C. Chlorination is complete in about an hour. After cooling, the undissolved matter is separated by filtration by suction, and the bulk of the reaction product is precipitated, in crystalline form, by diluting the liquor with benzene and ligroin. It is reddish-yellow in color, dissolves to a blue solution in concentrated sulfuric acid, and is precipitated therefrom, as a reddish-yellow precipitate, on dilution with water.

If the solution in sulfuric acid be warmed, hydrochloric acid is evolved, and, on dilution with water, a red precipitate, with bluish tinge, of the vat dyestuff described in Example 1 is obtained. The same dyestuff is obtained from the reddish-yellow product by warming it with nitrobenzene and sodium acetate, or on boiling with pyridine, aniline, or the like. For example, 10 parts of the highly chlorinated product are heated to boiling with 100 parts of aniline. The initially reddish-brown solution becomes bluish-red, and deposits red needles, with bluish tinge, of the vat dyestuff obtained in accordance with Example 1. This is filtered by suction, and washed with aniline.

*Example 5*

Chlorine is passed, at from 120° to 130° C., into a solution of 50 parts of acetylated dihydroxy-dinaphthazine, prepared for example by boiling dihydroxy-dinaphthazine with nitrobenzene and acetic anhydrid, in nitrobenzene until a sample of the reaction mass, dissolved in cold concentrated sulfuric acid, gives an orange yellow precipitate on dilution with water. 10 parts of potassium acetate are then introduced, and the mixture is heated to boiling. The formation of the dyestuff will be complete in a short time. The dyestuff gives the same reactions as that of Example 1.

*Example 6*

31 parts of dihydroxydinaphthazine are heated to boiling with 600 parts of nitrobenzene and 60 parts of benzoyl chlorid. A benzoyl compound is formed, with evolution of hydrochloric acid. After cooling down to from 120° to 130° C., chlorine is passed in until a sample of the reaction mass, dissolved in concentrated sulfuric acid, gives an orange yellow precipitate on dilution with water. 10 parts of potassium acetate are then added, and the further treatment proceeds as in the preceding example.

*Example 7*

32 parts of 8.8'-dihydroxy-1.2.1'.2'-dinaphthazine in a mixture of 600 parts of nitrobenzene and 50 parts of acetic anhydrid are heated to boiling. When all the product has gone into solution, the temperature of the same is lowered to 115° C., and 1 part of iodine added. About 260 parts of sulfuryl chlorid are now allowed to flow slowly into the solution during a period of about 4 hours, with efficient stirring, at a temperature of between 115 and 120° C. The highly chlorinated yellow product thus obtained contains a certain amount of red vat dyestuff, which, if desired, may be separated off by filtration. It is however more advantageous to saturate the reaction mixture with sulfur dioxid at about 25 to 30° C. After stirring for several hours while maintaining the same temperature, the excess of sulfur dioxid is removed by means of current of air, and the temperature raised to 180° C., after the addition of 60 parts of sodium acetate. The completion of the formation of the dyestuff is controlled in test-portions, and the dyestuff then filtered off by suction.

If in place of a mixture of nitrobenzene and acetic anhydrid, a chlorinated hydrocarbon, for example trichlorbenzene be employed as the diluent, a dyestuff is obtained which is identical with that just mentioned.

*Example 8*

10 parts of 8.8'-dihydroxy-1.2.1'.2'-dinaphthazine are boiled for about 25 hours with 300 parts of sulfuryl chlorid and 0.3 part of iodine under a reflux condenser. The yellow solution is filtered off from small amounts of impurities and the sulphuryl chlorid removed by distillation and treatment of the residue with cold water. The yellow reaction product dissolves to a brown solution in cncentrated sulfuric acid.

In order to convert the product into the dyestuff, 10 parts of the said product are boiled with 10 parts of anhydrous sodium acetate and 100 parts of a mixture of phenol and cresols. The dyestuff separates out in the crystalline form, it is filtered off by suction and washed with the said mixture of phenol and cresols, alcohol and water. It gives a blue solution with concentrated sulfuric acid and dyes cotton bluish-red shades from a yellow hydrosulfite vat. By treatment with concentrated sulfuric acid in the manner hereinafter described in Example 10 the dyestuff is obtained in a perfectly pure state.

Example 9

31 parts of 8.8'-dihydroxy-1.2.1'.2'-dinaphthazine are dissolved in 945 parts of industrial dichloroacetic acid. A steady stream of chlorine is passed into the reddish-violet solution at room temperature, that is 20° to 25° C., until a test portion of the reaction mixture on dilution with dichloroacetic acid gives a clear yellow solution, from which pure yellow flocks separate out on the addition of water.

The reaction mixture is then diluted with water and the flocculent yellow precipitate filtered off, washed out with water and dried by contact with the air. The product is a yellow powder, which dissolves in concentrated sulfuric acid with a brownish-yellow color and is readily soluble in the cold in the usual organic solvents. According to the analysis, 10 atoms of chlorine have been taken up by the molecule.

To convert this chlorination product into a vat dyestuff, 30 parts of the same may, for instance, be dissolved at room temperature, while stirring, in ten times that amount of concentrated sulfuric acid. 10 parts of copper powder are added to the brownish yellow solution and the mixture is stirred for 30 minutes at room temperature. A blue solution is thus obtained from which, after the separation from surplus copper, the dyestuff is isolated by precipitation with water. The chlorination product in the form of paste may also be converted into the dyestuff by treatment with hydrosulfite and ammonia solution at room temperature or by gently heating with pyridine and sulphurous acid or by heating with aqueous sulphurous acid under pressure or by other known and suitable methods. The said dyestuff dyes with a more yellowish tinge than that obtained according to Example 8.

Example 10

10 parts of the crude dyestuff, obtainable according to Example 7 are added, while stirring, to 100 parts of cold sulfuric acid of about 96 per cent strength. After stirring for about an hour, the undissolved residue is filtered off with suction, and washed with concentrated sulfuric acid and then with water. The dyestuff, which has been thus purified, gives red colorations on cotton in a still purer form and of a more bluish tinge than those obtained with the crude product. On diluting the sulfuric acid solution with water, a dyestuff is obtained which yields dyeings with a yellowish tinge similar to those obtained according to Example 9.

What we claim is:

1. The process for the production of halogenation products of 8.8'-dihydroxy-1.2.1'.2'-dinaphthazines containing more than 4 atoms of halogen in their molecule, which comprises subjecting a 8.8'-dihydroxy-1.2.1'.2'-dinaphthazine to a vigorous halogenation.

2. The process for the production of halogenation products of 8.8'-dihydroxy-1.2.1'.2'-dinaphthazines containing more than 4 atoms of halogen in their molecule, which comprises subjecting a 8.8'-dihydroxy-1.2.1'.2'-dinaphthazine to a vigorous halogenation in the presence of a dilution medium.

3. The process for the production of halogenation products of 8.8'-dihydroxy-1.2.1'.2'-dinaphthazines containing more than 4 atoms of halogen in their molecule, which comprises subjecting a 8.8'-dihydroxy-1.2.1'.2'-dinaphthazine to a vigorous halogenation in the presence of a mixture of an indifferent solvent with acetic anhydride.

4. The process for the production of halogenation products of 8.8'-dihydroxy-1.2.1'.2'-dinaphthazines containing more than 4 atoms of halogen in their molecule, which comprises subjecting a 8.8'-dihydroxy-1.2.1'.2'-dinaphthazine to a vigorous halogenation in the presence of a halogenation catalyst.

5. The process for the production of chlorination products of 8.8'-dihydroxy-1.2.1'.2'-dinaphthazines and containing more than 4 atoms of chlorine in their molecule, which comprises subjecting a 8.8'-dihydroxy-1.2.1'.2'-dinaphthazine to a vigorous chlorination.

6. The process for the production of chlorination products of 8.8'-dihydroxy-1.2.1'.2'-dinaphthazines and containing more than 4 atoms of chlorine in their molecule, which comprises subjecting a 8.8'-dihydroxy-1.2.1'.2'-dinaphthazine to a vigorous chlorination in the presence of a small quantity of iodine.

7. The process for the production of red vat dyestuffs, which comprises subjecting a 8.8'-dihydroxy-1.2.1'.2'-dinaphthazine to a vigorous halogenation and splitting off part of the halogen from the halogenation product.

8. The process for the production of red vat dyestuffs which comprises subjecting a 8.8'-dihydroxy-1.2.1'.2'-dinaphthazine to a vigorous halogenation and splitting off part of the halogen from the halogenation product by treatment with an agent capable of splitting off halogen.

9. The process for the production of red vat dyestuffs, which comprises subjecting a 8.8'-dihydroxy-1.2.1'.2'-dinaphthazine to a vigorous halogenation and splitting off part of the halogen from the halogenation product in the form of halogen hydrid by treatment with an agent capable of splitting off halogen hydrid.

10. The process for the production of red vat dyestuffs which comprises subjecting a 8.8'-dihydroxy-1.2.1'.2'-dinaphthazine to a vigorous halogenation and splitting off part of the halogen from the halogenation product by treating with a reducing agent.

11. The process for the production of red vat dyestuffs which comprises subjecting a 8.8'-dihydroxy-1.2.1'.2'-dinaphthazine to a vigorous halogenation, splitting off part of the halogen from the halogenation product and purifying the product by treatment with sulfuric acid.

12. As new articles of manufacture, halogenation products of 8.8'-dihydroxy-1.2.1'.2'-dinaphthazines containing at least 6 halogen atoms in the molecule, which products are pale yellow to brown in color, are readily soluble in organic solvents, and are converted into red vat dyestuffs by splitting off halogen.

13. As new articles of manufacture, the red vat dyestuffs which give yellow vats with alkaline hydrosulphite solutions and blue solutions in concentrated sulfuric acid, which on cautious oxidation with bichromate turn brown, which latter coloration is converted into blue on treatment with copper powder, which dyestuffs may be obtained by subjecting a 8.8'-dihydroxy-1.2.1'.2'-dinaphthazine to a vigorous halogenation and splitting off halogen, and which contain more than 4 halogen atoms in the molecule.

14. As new articles of manufacture, the red vat dyestuffs which give yellow vats with alkaline hydrosulphite solutions and blue solutions in concentrated surfuric acid, which on cautious oxidation with bichromate turn brown, which latter coloration is converted into blue on treatment with copper powder, which dyestuffs may be obtained by subjecting a 8.8'-dihydroxy-1.2.1'.2'-dinaphthazine to a vigorous chlorination and splitting off chlorine and which contain more than 4 chlorine atoms in the molecule.

15. As a new article of manufacture, the red vat dyestuff with a bluish tinge which gives a yellow vat with alkaline hydro-sulphite solutions and a blue solution in concentrated sulfuric acid, which on oxidation with bichromate turns brown, which latter coloration is converted into blue on treatment with copper powder, which dyestuff may be obtained by subjecting 8.8'-dihydroxy-1.2.1'.2'-dinaphthazine to a vigorous chlorination and splitting off chlorine, and which contains more than 6 chlorine atoms in the molecule.

In testimony whereof we have hereunto set our hands.

WALTER BRUCK.
FRITZ HELWERT.